United States Patent [19]

Helm et al.

[11] Patent Number: 5,790,605

[45] Date of Patent: Aug. 4, 1998

[54] METHOD FOR DETERMINING VOTING WINDOWS IN A DIVERSITY REPEATER

[75] Inventors: David P. Helm, Glendale Heights; Phillip C. Hargrave, Palatine, both of Ill.

[73] Assignee: Motorola, Inc., Schaumburg, Ill.

[21] Appl. No.: 508,694

[22] Filed: Jul. 28, 1995

[51] Int. Cl.⁶ ...................................................... H04B 7/10
[52] U.S. Cl. ........................... 375/347; 375/356; 455/133
[58] Field of Search ...................................... 375/211, 347, 375/357; 370/235, 236, 252, 315, 350; 455/101, 132, 133

[56] References Cited

U.S. PATENT DOCUMENTS 5,268,933  12/1993  Averbuch ............................... 375/347
5,663,990  9/1997  Bolgiano et al. ........................ 375/347

*Primary Examiner*—Don N. Vo
*Attorney, Agent, or Firm*—Christopher P. Moreno

[57] ABSTRACT

In an improved diversity repeater (200), a plurality of frame sets (213) corresponding to a message are received by a time stamper (202) such that frames within each frame set are time stamped. An arrival time differentiator (204) determines arrival time differentials (217) for each frame set based on time stamps. An averager (206) averages the arrival time differentials together. The resulting averaged arrival time differentials (219) are used by a voting window determiner to determine a new voting window (221). The new voting window is used to perform voting on frame sets corresponding to a subsequent message.

18 Claims, 3 Drawing Sheets ces in delay inherent to each communication link used to connect the receivers to the comparator almost always cause the frames forwarded by the receivers to be received at the comparator at different times. In order to include as many possible frames in the voting process for a particular voted frame, thus enhancing performance of the diversity repeater, the comparator must wait, starting from the time the first copy of the frame is received, for a long enough period of time to accommodate the largest delay present in the receiver-to-comparator links. This period of time is commonly referred to as a voting window. In the interest of minimizing overall system delay, it is desirable to keep the voting window length to a minimum.

METHOD FOR DETERMINING VOTING WINDOWS IN A DIVERSITY REPEATER

FIELD OF THE INVENTION

The present invention relates to an improved diversity repeater and, in particular, to a method for determining a voting window therein.

BACKGROUND OF THE INVENTION

Voting, as used by diversity repeaters, is known in digital wireless communication systems. A signal source will transmit a signal comprising frames, i.e., time-delimited portions of a digital signal. At a diversity repeater, the frames are received by receivers, and the frames as received by each receiver are forwarded to a comparator. Thus, for any given frame sent by the signal source, multiple copies of that given frame (a frame set), corresponding to the number of receivers that received it, are sent to the comparator. Each of the multiple copies of the given frame are received with varying levels of reception quality. For each frame in the original signal, the comparator votes on the multiple frames received such that a voted frame is produced. Typically, the voted frame is either a received frame having the best reception quality as measured by any of a number of quality estimation techniques, or the voted frame is a "new" frame comprised of various portions of one or more received frames, each selected portion possessing the best reception quality. Such diversity repeaters function best when all possible candidate frames are considered each time a voted frame is produced.

Diversity repeaters are typically configured such that the receivers are in communication with the comparator via infrastructure-type communication links. Infrastructure-type communication links typically comprise, and are often a mixture of, land-based wireline links, microwave links, or more recently, network-type communication links. Variances in delay inherent to each communication link used to connect the receivers to the comparator almost always cause the frames forwarded by the receivers to be received at the comparator at different times. In order to include as many possible frames in the voting process for a particular voted frame, thus enhancing performance of the diversity repeater, the comparator must wait, starting from the time the first copy of the frame is received, for a long enough period of time to accommodate the largest delay present in the receiver-to-comparator links. This period of time is commonly referred to as a voting window. In the interest of minimizing overall system delay, it is desirable to keep the voting window length to a minimum.

Typically, in communication systems that include diversity repeaters, the delays between the receivers and the comparator are assumed to be static and are measured once when the system is first set-up. Thus, the voting window is set in order to accommodate the largest delay measured at the time of system set-up. However, experience has shown that the delays actually vary, relatively quickly, with time. This may occur, for instance, when a receiver is linked to a comparator through a large network in which delays vary as a function of total network traffic.

When the delays vary such that the maximum delay becomes larger than the maximum delay measured during system set-up, it is possible for frames to be excluded from the voting since the voting window cannot handle the increased delay. This problem can be solved by setting the voting window to a very long period of time, thereby accommodating the longest conceivable delay. However, this solution is unsatisfactory because it adds a significant delay to overall system performance.

Conversely, when the maximum delay falls below the maximum delay measured during system set-up, an opportunity to operate the overall system with less delay, an thus more efficiently, is lost because the voting window cannot be adjusted to reflect the lower delay. Although this situation has not been addressed in prior art solutions, it would be advantageous to allow a diversity repeater to accommodate such conditions. Therefore, a need exists for an approach that allows voting windows to be determined in diversity repeaters such that variances in delays between receivers and a comparator are accommodated.

DESCRIPTION OF A PREFERRED EMBODIMENT

The present invention provides a method and apparatus for voting window determination in an improved diversity repeater. A plurality of frame sets are received by a comparator. A time stamper time stamps frames of each frame set and an arrival time differentiator determines arrival time differentials for each frame set based on the time stamps. The arrival time differentials for each frame set are averaged together and a voting window determiner uses the resulting averaged set of arrival time differentials to determine the new voting window. In one embodiment of the present invention, the new voting window is based on the maximum averaged arrival time differential. Using this approach, a comparator can determine a new voting window which takes into account the most recent delays present in a system without having to incur a large fixed delay.

Figure 1:
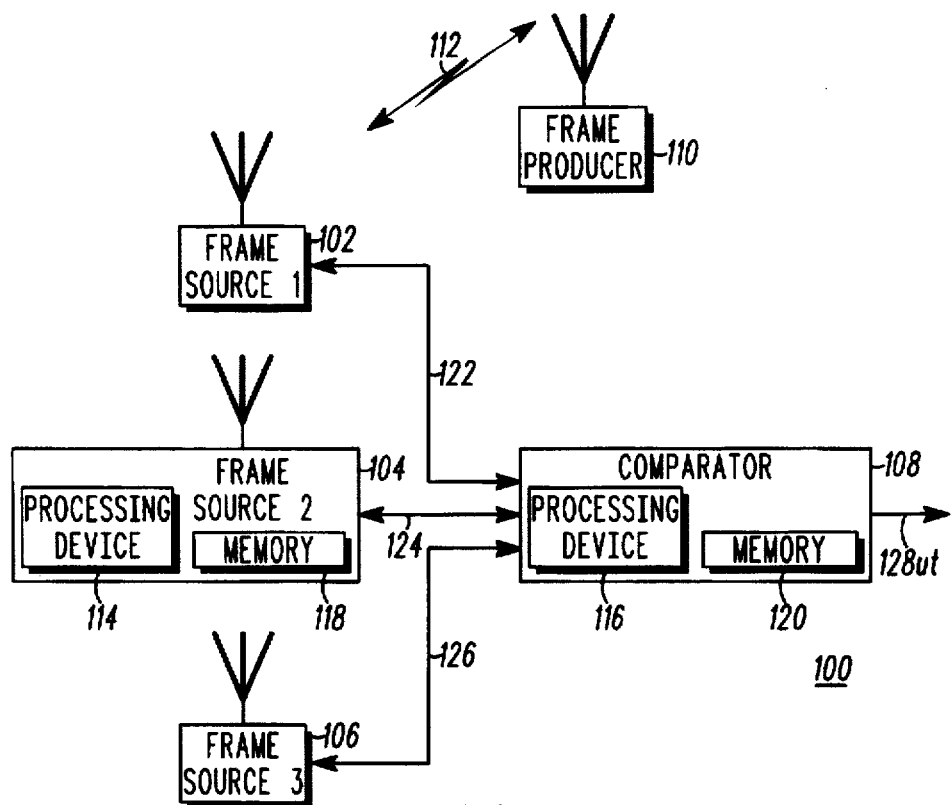
FIG. 1 is a block diagram of digital wireless communication system that includes a diversity repeater.

The present invention can be more fully described with reference to FIGS. 1-5. FIG. 1 is a block diagram of a digital wireless communication system 100 comprising a diversity repeater and a plurality of frame producers 110 (only one shown). The frame producers 110 wirelessly transmit framed digital voice/data and, in a preferred embodiment, comprise wireless communication units such as ASTRO™ mobile or portable radios by Motorola, Inc. Any of a number of known techniques for the transmission and reception of framed digital voice/data signals may be used by the present invention. As shown, the frame producers 110 transmit digitally represented voice/data signals via a wireless communication resource 112. Using the wireless communication resource 112, frame sources 102–106 (relative to a comparator 108) receive the signals sent by the frame producers 110.

In a preferred embodiment, the frame sources 102–106 comprise wireless receivers such as QUANTAR™ receivers manufactured by Motorola, Inc. Although three frame sources are shown, any number of frame sources could be used as determined by system requirements and limitations. As the frame sources 102–106 receive frames, each forwards the frames to a comparator 108 via a digital infrastructure communication link 122–126. The links 122–126 can be implemented using any of a number of known techniques, such as land-based wireline links, microwave links, or network-type communication links. Although the links 122–126 are typically established for the exclusive use of the communication system 100, they are often part of a larger public communication network. As such, the delays incurred by the links 122–126 can be large and time variant. These delays are caused, for example, by fluctuating system loading and rerouting.

As described above, the comparator 108 receives frames from the frame sources in order to produce voted frames. A suitable comparator 108 is an ASTRO™TAC comparator manufactured by Motorola Inc. Each frame produced by a frame producer will typically result in multiple copies of that frame (the frame set) at the comparator, each frame of the frame set having varying levels of channel degradation. It is possible, however, that more than one frame source is sending frames at the same time. Before voting is performed on any frames, the comparator first establishes the context of the frames; received frames corresponding to a given frame producer must be grouped together prior to voting. This process is commonly referred to as context determination. For the purposes to the present invention, it is assumed that context determination has been performed, resulting in a plurality of frame sets, prior to the voting process.

The comparator 108 and the frame sources 102–106 (only shown in the second frame source 104) include digital processing devices 114–116, such as microprocessors and/or digital signal processors, and memory devices 118–120, such as random access memory (RAM) and/or read-only memory (ROM). The present invention can be implemented as software routines stored in the memories 118–120 and executed by the processing devices 114–116 resident in both the frame sources 102–106 and comparator 108. In a preferred embodiment, the present invention is implemented using the memory 120 and processing device 116 resident on the comparator 108.

Figure 2:
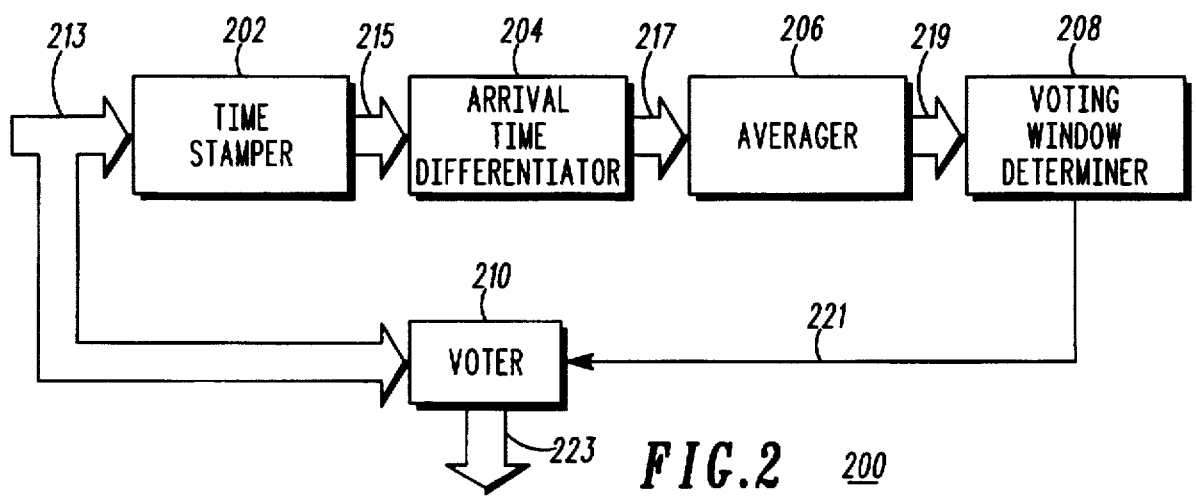
FIG. 2 is a block diagram of an improved diversity repeater.

FIG. 2 is a block diagram of an improved diversity repeater 200 comprising a time stamper 202, an arrival time differentiator 204, an averager 206, a voting window determiner 208, and a voter 210. Frame sets 213 are received by the time stamper 202. It is important to note that the frames included within each frame set are not time-aligned due to the delays inherent to the infrastructure links used to convey the frames. Thus, each frame included in each frame set 213 is time-stamped with its arrival time. The time stamp for each frame can be a digital representation appended to the frame. Any precision time measurement device can be used to implement the time stamper 202, such as a local clock or a universal time source (e.g., a Global Positioning Satellite (GPS) signal). The time stamps produced by the time stamper 202 should sufficiently precise such that any differences in arrival times between frames in a given frame set are accurately measurable. The time stamped frame sets 215 are sent to the arrival time differentiator 204.

The arrival time differentiator 204 determines, for each frame set, the differences in arrival time, hereinafter referred to as arrival time differentials, between the leading frame and all later frames in the frame set. This is done using the time stamps for each frame in the time stamped frame sets 215. The process of calculating the arrival time differentials is discussed in further detail with respect to FIGS. 3 and 4. The sets of arrival time differentials 217 corresponding to each frame set 213 are sent to the averager 206.

The averager 206 averages the sets of arrival time differentials 217, as described in further detail below. In a preferred embodiment, the arrival time differentials 217 for all frame sets 213 corresponding to a single message sent by a frame source are processed by the averager 206. When the last set of arrival time differentials 217 has been processed by the averager 206, an averaged set of arrival time differentials 219 is forwarded to the voting window determiner 208.

Based on the averaged set of arrival time differentials 219, the voting window determiner 208 determines a voting window 221. As described above, the voting window 221 describes a period of time during which the voter 210 will wait before voting on frames included in any given frame set 213. In a preferred embodiment, the voting window 221 resulting from the most recent message is used by the voter 210 to vote on frame sets 213 corresponding to the next received message. Voted frames 223 are routed to their appropriate destination.

Figure 3:
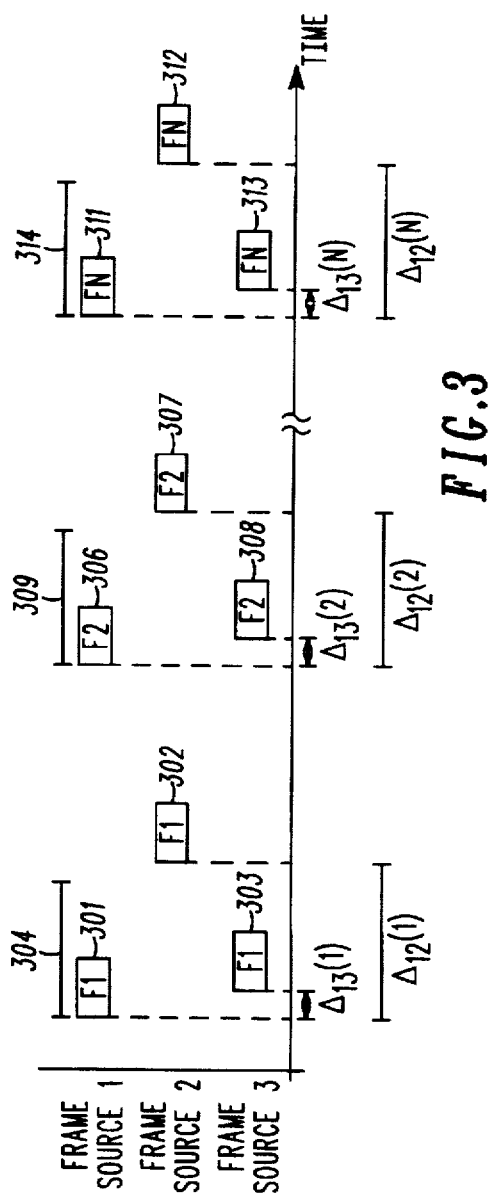
FIGS. 3 and 4 illustrate an example useful in describing how a voting window can be determined.
Figure 4:
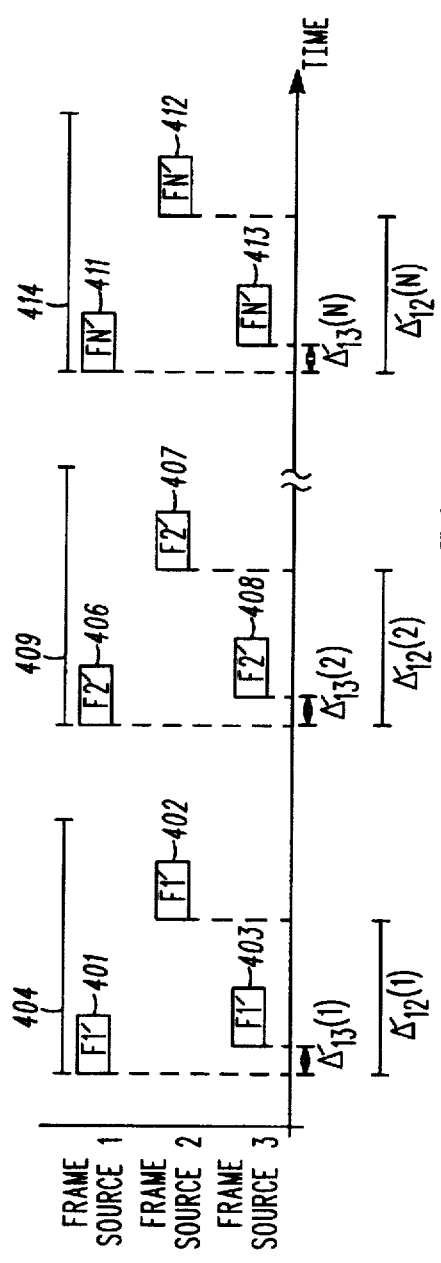

Operation of the improved diversity repeater of FIG. 2 is best illustrated through the use of an example. FIGS. 3 and 4 illustrate an example useful in describing how a voting window can be determined. As shown, n frame sets 301–303, 306–308, and 311–313, corresponding to a single message sent by one frame producer, are received from three different frame sources. For each frame set, a period of time 304, 309, 314, based on a voting window is shown. The periods of time 304, 309, 314 are initiated by leading frames 301, 306, 311 of each frame set. A leading frame is that frame for a given frame set having the earliest arrival time. For each frame set, a timely received portion (i.e., those frames arriving within the period of time established by the voting window) are used in the voting process. Thus, as shown, a timely received portion 301, 303 of the initial frame set 301–303 is used for voting; a timely received portion 306, 308 of the second subsequent frame set 306–308 is used for voting; and a timely received portion 311, 313 of the n-th subsequent frame set 311–313 is used for voting.

Arrival time differentials $\Delta_{1j}(k)$ for j=2 to M (# of frame sources) and k=1 to N (the number of frame sets in the message) are also shown. Each $\Delta_{1j}(k)$ is the time difference between the leading frame and each later frame within the frame set. Although the leading frame in each frame set of FIG. 3 corresponds to the first frame source, in practice, any of the frame sources contributing to the frame set could produce the leading frame for a frame set. Furthermore, the delays caused by the infrastructure links, although time variant, typically do not vary quickly relative to the time needed to complete a single message; this implies that the frame source corresponding to the leading frame of the first frame set will typically correspond to the leading frame of all remaining frame sets in the message. Thus, for each frame set in the given example, the set of arrival time differentials comprises a $\Delta_{12}$ and a $\Delta_{13}$ measurement. In one embodiment, the averaged set of arrival time differentials is determined according to:

$$\text{Average } \Delta_{1j} = \frac{1}{N} \sum_{k=1}^{N} \Delta_{1j}(k) \qquad (1)$$

where j and N are defined as above. Thus, the averaged set of arrival time differentials comprises M-1 values, each describing the average arrival time differential between respective frame sources. The averaged arrival time differentials are then used to determine a new voting window. In one embodiment of the present invention, the voting window becomes the maximum averaged arrival time differential plus the duration of a complete frame.

Table 1 below illustrates an exemplary compilation of averaged arrival time differentials between possible frame sources for the most recently received messages.

TABLE 1

| | Frame Source | | | | | | |
|---|---|---|---|---|---|---|---|
| | 1 | 2 | 3 | 4 | ... | X-1 | X |
| Most Recent | 0 | 60 | 10 | — | ... | — | — |
| | — | 55 | 5 | 0 | ... | 40 | — |
| | . | . | . | . | . | . | . |
| | . | . | . | . | . | . | . |
| | . | . | . | . | . | . | . |
| | 0 | 60 | 10 | — | ... | 45 | 35 |
| Least Recent | — | — | 5 | 0 | ... | 40 | 30 |

As shown in Table 1, information regarding the averaged arrival time differentials between X different frame sources for the various combinations of frame sources for the most recent messages can be maintained. As newer messages are processed, older entries are replaced; in essence, a rotationg buffer. Entries having a 0 value indicate that frame source which corresponds to the leading frame for a given combination of receivers. Thus, in the examples shown, the first row (corresponding to the most recently processed message) indicates that when frame sources 1-3 are involved, frame source 1 corresponds to the leading frame, and the most recent arrival time differentials between the first frame source and the second and third frame sources are 60 ms. and 10 ms., respectively. Similar entries are maintained for a predetermined number of previously processed messages. In one embodiment, Table 1 is implemented in the comparator 108 of FIG. 1. Using Table 1, the comparator 108 could determine what value the voting window should take based on the maximum averaged arrival time differential listed in the entire table. Thus, using the values shown, the voting window for the next message to be processed would be set to 60 ms. to accomodate the possibility that the slowest frame source (frame source 2) would be involved in the voting. (At the beginning of any message, it cannot be determined which frame sources will be involved, thus it is necessary to allow for the slowest possible frame source.)

An advantage of this approach is that the voting window will not only reflect increases in the slowest delay time, but also decreases in the slowest delay time caused by variances in the infrastructure links. In this manner, the overall system efficiency can improve when possible. In the example shown in FIG. 3, the maximum averaged arrival time differential will correspond to $\Delta_{12}$. Thus, the voting window used during the next message will be based on $\Delta_{12}$. This is illustrated in FIG. 4 where the periods of time 404, 409, and 414 are based on the voting window determined during the last message which required a combination of frame sources 1-3, i.e., the message illustrated in FIG. 3. In this manner, frames 402, 407, 412 received from frame source 2 form part of the timely received portion for each frame set 401-403, 406-408, and 411-413, respectively. It is recognized that other methods of updating the voting window based on the averaged arrival time differentials could also be used.

Figure 5:
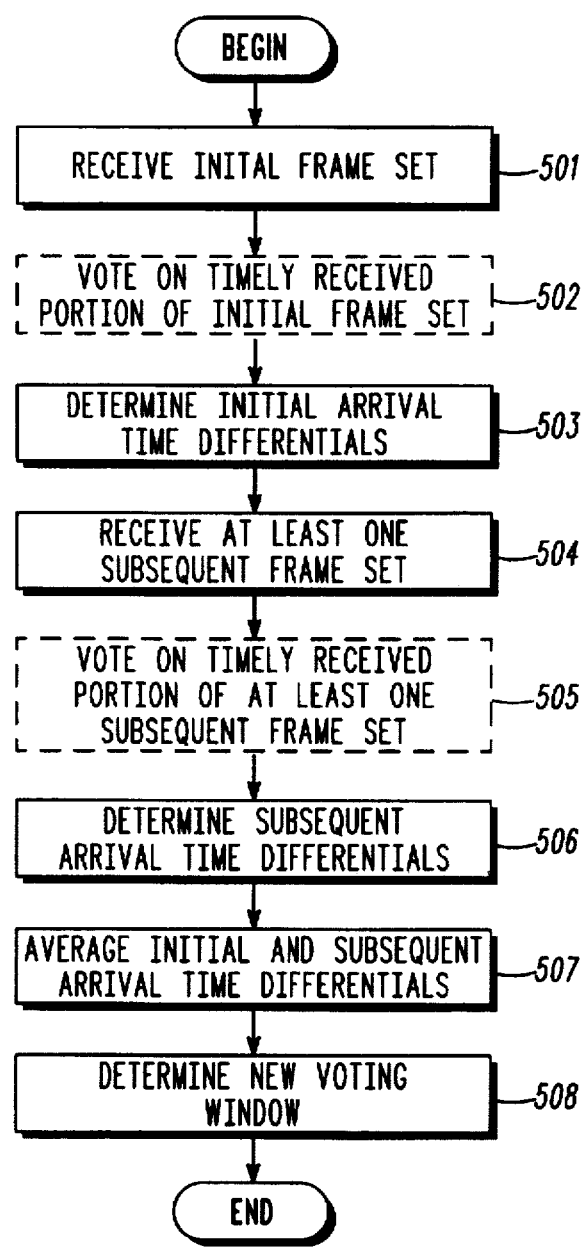
FIG. 5 is a flow chart describing operation of the improved diversity repeater of FIG. 2.

FIG. 5 is a flow chart describing operation of the improved diversity repeater of FIG. 2. At step 501, the time stamper 202 receives an initial frame set, time-stamping each frame in the initial frame set as described above. Optionally, at step 502, the timely received portion of the initial frame set is voted upon by the voter 210. Additionally, at step 503, the arrival time differentiator 204 determines an initial set of arrival time differentials, as described above, for the initial frame set.

In practice, most messages sent by a frame source, and subsequently arriving at a comparator, will include multiple frame sets. In a preferred embodiment of the present invention, the minimum number of frame sets corresponding to a single message and received by a comparator is nine. Thus, at step 504, at least one subsequent frame set is received by the time stamper, which time stamps the constituent frames of each subsequent frame set. As at step 502, the timely received portion of each of the subsequent frame sets can be voted upon by the voter 210 at step 505. At step 506, for each of the subsequent sets of frames, a corresponding subsequent set of arrival time differentials is computed.

At step 507, the averager 206 averages the initial set of arrival time differentials and the subsequent sets of arrival time differentials. As an alternative to the averaging performed according to Equation (1) above, a moving average or a weighted moving average, could be also used, depending on the desired system performance.

Upon completion of the message, the voting window determiner 208 determines a new voting window at step 508. As described above, a table similar to Table 1 could be maintained and used by the voting window determiner 208 in deriving the new voting window. It is important to note that the particular method used to maintain such a table will have a significant impact on system performance. In one method, averages already in the table, corresponding to previous messages would be discarded and replaced by the most recently determined averages. This method would allow short variances in delay to quickly effect subsequent messages.

Another method for updating such a table would be to re-average the most current averaged arrival time differentials with those already stored in the table, using the previous number of messages as a weighting factor. Such a method would cause a slow change to the voting window as the number of messages processed increases.

In yet another method, the most current averaged arrival time differentials are re-averaged with those already stored in the table without using the previous number of messages as a weighting factor. A further refinement to this method could be achieved by more heavily weighting increases in the averaged arrival time differentials than decreases in the averaged arrival time differentials. Such a refinement reflects a desire for decreased system throughput delay when possible, but with an even stronger sensitivity to the need to vote on as many frames as possible. Those of ordinary skill in the art will recognize that other possible update methods could be used.

With the present invention, a method and apparatus for voting window determination in an improved diversity repeater is provided. Prior art diversity repeaters rely on static infrastructure delays between frame sources and a comparator when determining voting windows. However, when the infrastructure delays are actually variant, as is often the case, such prior art diversity repeaters will either vote on less than all possible frames when delays increase, or miss opportunities to operate with less throughput delay when delays decrease. In contrast, the present invention allows determination of voting windows to reflect variations in infrastructure delays. This is a significant improvement over prior art diversity repeaters for a number of reasons. Without automatically building in a large delay (in the form of a "hard-coded" voting window), the present invention makes increases in infrastructure delays less likely to cause frames to excluded from voting. Also, decreases in delays are allowed to decrease overall system throughput delay when possible. Furthermore, the need to determine infrastructure delays at the time of system set-up (an often difficult and time-consuming process) is eliminated because a diversity repeater in accordance with the present inventions can "learn" what the delays are through normal operation of the system.

We claim:

1. An improved diversity repeater that includes wireless receivers in communication with a comparator, wherein the comparator asynchronously receives a plurality of frame sets corresponding to a message from the at least two wireless receivers, wherein the improved diversity repeater comprises:

a time stamper, arranged to receive the plurality of frame sets, for time stamping frames of each frame set of the plurality of frame sets;

an arrival time differentiator, operably coupled to the time stamper, for determining arrival time differentials for each frame set, the arrival time differentials based on time stamps of the frames of each frame set;

an averager, operably coupled to the arrival time differentiator, for averaging the arrival time differentials to produce an averaged set of arrival time differentials; and a voting window determiner, operably coupled to the averager, for determining a new voting window based on the averaged set of arrival time differentials.

2. The improved diversity repeater of claim 1, further comprising a voter, operably coupled to the voting window determiner and arranged to receive another plurality of frame sets corresponding to another message, for voting on each frame set of the another plurality of frame sets using the new voting window.

3. A method for a comparator to determine a new voting window, the method comprising steps of:

receiving an initial frame set from a plurality of frame sources, the initial frame set simultaneously originating from a frame producer;

determining an initial set of arrival time differentials between frames of the initial frame set;

receiving at least one subsequent frame set from the plurality of frame sources, the at least one subsequent frame set simultaneously originating from the frame producer;

for each particular subsequent frame set of the at least one subsequent frame set, determining a set of arrival time differentials between frames of the particular subsequent frame set to produce subsequent sets of arrival time differentials;

averaging the initial set of arrival time differentials with the subsequent sets of arrival time differentials to produce an averaged set of arrival time differentials; and determining the new voting window based on the averaged set of arrival time differentials.

4. The method of claim 3, further comprising the step of receiving the initial frame set, wherein the frame producer comprises a wireless communication unit and the plurality of frame sources comprises wireless receivers.

5. The method of claim 3, wherein the initial frame set and the at least one subsequent frame set correspond to a message sent by the frame producer.

6. The method of claim 3, the step of determining the initial set of arrival time differentials further comprising steps of:

time stamping a leading frame of the initial frame set;

time stamping later frames of the initial frame set; and calculating differences between time stamps of the leading frame and each of the later frames to produce the initial set of arrival time differentials.

7. The method of claim 3, the step of averaging the initial set of arrival time differentials with the subsequent sets of arrival time differentials further comprising a step of:

averaging corresponding arrival time differentials from the initial set of arrival time differentials and the subsequent sets of arrival time differentials to produce the averaged set of arrival time differentials.

8. The method of claim 3, further comprising the step of determining the new voting window based on the averaged set of arrival time differentials, wherein the new voting window is based on a maximum averaged arrival time differential of the averaged set of arrival time differentials.

9. A method for a comparator to determine a new voting window, the method comprising steps of:

receiving an initial frame set from a plurality of frame sources, the initial frame set simultaneously originating from a frame producer;

voting on a timely received portion of the initial frame set, the timely received portion received within a period of time based on a voting window and initiated by a leading frame of the initial frame set;

determining an initial set of arrival time differentials between frames of the initial frame set;

receiving at least one subsequent frame set from the plurality of frame sources, the at least one subsequent frame set simultaneously originating from the frame producer;

for each particular subsequent frame set of the at least one subsequent frame set, voting on a timely received portion of the particular subsequent frame set, the timely received portion received within a period of time based on the voting window and initiated by a leading frame of the particular subsequent frame set;

for each particular subsequent frame set of the at least one subsequent frame set, determining a set of arrival time differentials between frames of the particular subsequent frame set to produce subsequent sets of arrival time differentials;

averaging the initial set of arrival time differentials with the subsequent sets of arrival time differentials to produce an averaged set of arrival time differentials; and determining the new voting window based on the averaged set of arrival time differentials.

10. The method of claim 9, further comprising the step of receiving the initial frame set, wherein the frame producer comprises a wireless communication unit and the plurality of frame sources comprises a plurality of wireless receivers.

11. The method of claim 10, wherein the initial frame set and the at least one subsequent frame set correspond to a message sent by the frame producer.

12. The method of claim 9, further comprising the step of determining the new voting window based on the averaged set of arrival time differentials, wherein the new voting window is based on a maximum averaged arrival time differential of the averaged set of arrival time differentials.

13. The method of claim 9, further comprising steps of:

receiving another initial frame set from a plurality of frame sources, the another initial frame set simultaneously originating from another single frame producer; and voting on a timely received portion of the another initial frame set received within another period of time based on the new voting window.

14. In a digital wireless communication system comprising a plurality of wireless communication units, a plurality of wireless receivers in communication with the plurality of wireless communication units, and a comparator operably coupled to the plurality of wireless receivers, a method for the comparator to determine a new voting window, the method comprising steps of:

receiving an initial frame set from at least some of the plurality of wireless receivers, the initial frame set simultaneously originating from a wireless communication unit of the plurality of wireless communication units;

determining an initial set of arrival time differentials between frames of the initial frame set;

receiving at least one subsequent frame set from the plurality of wireless receivers, the at least one subsequent frame set simultaneously originating from the wireless communication unit;

for each particular subsequent frame set of the at least one subsequent frame set, determining a set of arrival time differentials between frames of the particular subsequent frame set to produce subsequent sets of arrival time differentials;

averaging the initial set of arrival time differentials with the subsequent sets of arrival time differentials to produce an averaged set of arrival time differentials; and determining the new voting window based on the averaged set of arrival time differentials.

15. The method of claim 14, wherein the initial frame set and the at least one subsequent frame set correspond to a message sent by the wireless communication unit.

16. The method of claim 14, the step of determining the initial set of arrival time differentials further comprising steps of:

time stamping a leading frame of the initial frame set;

time stamping later frames of the initial frame set; and calculating differences between time stamps of the leading frame and each of the later frames to produce the initial set of arrival time differentials.

17. The method of claim 14, the step of averaging the initial set of arrival time differentials with the subsequent sets of arrival time differentials further comprising a step of:

averaging corresponding arrival time differentials from the initial set of arrival time differentials and the subsequent sets of arrival time differentials to produce the averaged set of arrival time differentials.

18. The method of claim 14, further comprising the step of determining the new voting window based on the averaged set of arrival time differentials, wherein the new voting window is based on a maximum averaged arrival time differential of the averaged set of arrival time differentials.

* * * * *